(12) United States Patent
Rottier et al.

(10) Patent No.: US 9,522,785 B1
(45) Date of Patent: Dec. 20, 2016

(54) RAIL CLIP FOR CONVEYOR WEAR STRIP

(71) Applicant: Nercon Eng. & Mfg., Inc., Neenah, WI (US)

(72) Inventors: Andrew Rottier, Green Bay, WI (US); Jeff Falash, Suring, WI (US)

(73) Assignee: Nercon Eng. & Mfg., Inc., Neenah, WI (US)

( * ) Notice: Subject to any disclaimer, the term of this patent is extended or adjusted under 35 U.S.C. 154(b) by 0 days.

(21) Appl. No.: 14/730,910

(22) Filed: Jun. 4, 2015

(51) Int. Cl.
B65G 15/60 (2006.01)
B65G 15/62 (2006.01)
F16B 2/12 (2006.01)
F16B 2/14 (2006.01)

(52) U.S. Cl.
CPC ............. B65G 15/62 (2013.01); F16B 2/12 (2013.01); F16B 2/14 (2013.01)

(58) Field of Classification Search
CPC ...... B65G 15/62; B65G 2207/48; B65G 21/02
USPC ...................... 198/837, 841, 836.1
See application file for complete search history.

(56) References Cited

U.S. PATENT DOCUMENTS

| | | | |
|---|---|---|---|
| 2,809,742 A | 10/1957 | Holz | |
| D189,147 S | 11/1960 | Theodore | |
| 3,286,817 A | 11/1966 | Brigham | |
| D208,803 S | 10/1967 | Knowles | |
| D209,071 S | 10/1967 | Koch | |
| 3,754,636 A | 8/1973 | Boy | |
| D262,695 S | 1/1982 | Di | |
| D293,037 S | 12/1987 | Capawana | |
| 4,958,725 A * | 9/1990 | Meade | B65G 21/2072 198/836.1 |
| D313,882 S | 1/1991 | Kanian | |
| D340,564 S | 10/1993 | Ledingham | |
| 5,626,221 A * | 5/1997 | Ledingham | B65G 21/2072 198/836.1 |
| 5,803,687 A | 9/1998 | Ledingham | |
| 5,896,980 A | 4/1999 | Butler | |

(Continued)

OTHER PUBLICATIONS

"Conveyor Components Chains Belts and Bearings: Rail Clips," System Plast, Emerson Industrial Automation, emersononlinecatalog.com, Iss.6.1; http://www.emersononlinecatalog.com/guide/Conveyor_Components_Chains_Belts_and Bearings/235.php.

(Continued)

Primary Examiner — James R Bidwell
(74) Attorney, Agent, or Firm — Nicholas A. Kees; Godfrey & Kahn, S.C.

(57) ABSTRACT

A mounting clip connected to a conveyor frame for supporting the wear strip with respect to the frame. The mounting clip includes a grip plate having a base portion, and a pierce portion joined to the base portion at a bend, the pierce portion having a tooth protruding from the pierce portion at an edge of the pierce portion opposite the bend. The mounting clip further includes a second plate having a second plate base portion and a riser portion. A stud is connected to the second plate base portion and passes through the base portion of the grip plate and through a portion of the conveyor frame. A nut is threaded onto the stud, thereby capturing the portion of the conveyor frame. The wear strip is captured between the pierce portion and the riser portion upon installation and the tooth penetrates the wear strip upon installation.

10 Claims, 4 Drawing Sheets

(56) References Cited

U.S. PATENT DOCUMENTS

| | | | |
|---|---|---|---|
| D423,749 S | 4/2000 | Musil et al. | |
| 6,053,308 A | 4/2000 | Vogrig et al. | |
| 6,250,841 B1 | 6/2001 | Ledingham | |
| 6,287,045 B1 * | 9/2001 | Ledingham | B65G 21/2072 198/836.1 |
| 6,543,608 B2 | 4/2003 | Ledingham et al. | |
| D482,732 S | 11/2003 | Mcilvaine | |
| 6,799,676 B1 | 10/2004 | Shipmon | |
| 7,237,669 B2 | 7/2007 | Alldredge et al. | |
| 7,926,648 B2 | 4/2011 | Petrovic et al. | |
| 2002/0063043 A1 | 5/2002 | Herren | |
| 2006/0237292 A1 * | 10/2006 | Ryan | B65G 21/00 198/860.1 |
| 2007/0051588 A1 * | 3/2007 | Russell | B65G 17/086 198/851 |
| 2010/0282576 A1 * | 11/2010 | Elsner | B65G 21/22 198/837 |

OTHER PUBLICATIONS

"Gripwell: 4B Braime Elevator Components, Elevator Belt Fastener," Direct Industry, directindustry.com; http://www.directindustry.com/prod/4b-braime-elevator-components/elevator-betl-fastener-31528-1133279.html.

"Self-Lock: Light Duty," MLT—Minet Lacking Technology, mlt-lacing.com; http://www.mlt-lacing.com/en/mechanical-fasteners/self-lock.

\* cited by examiner

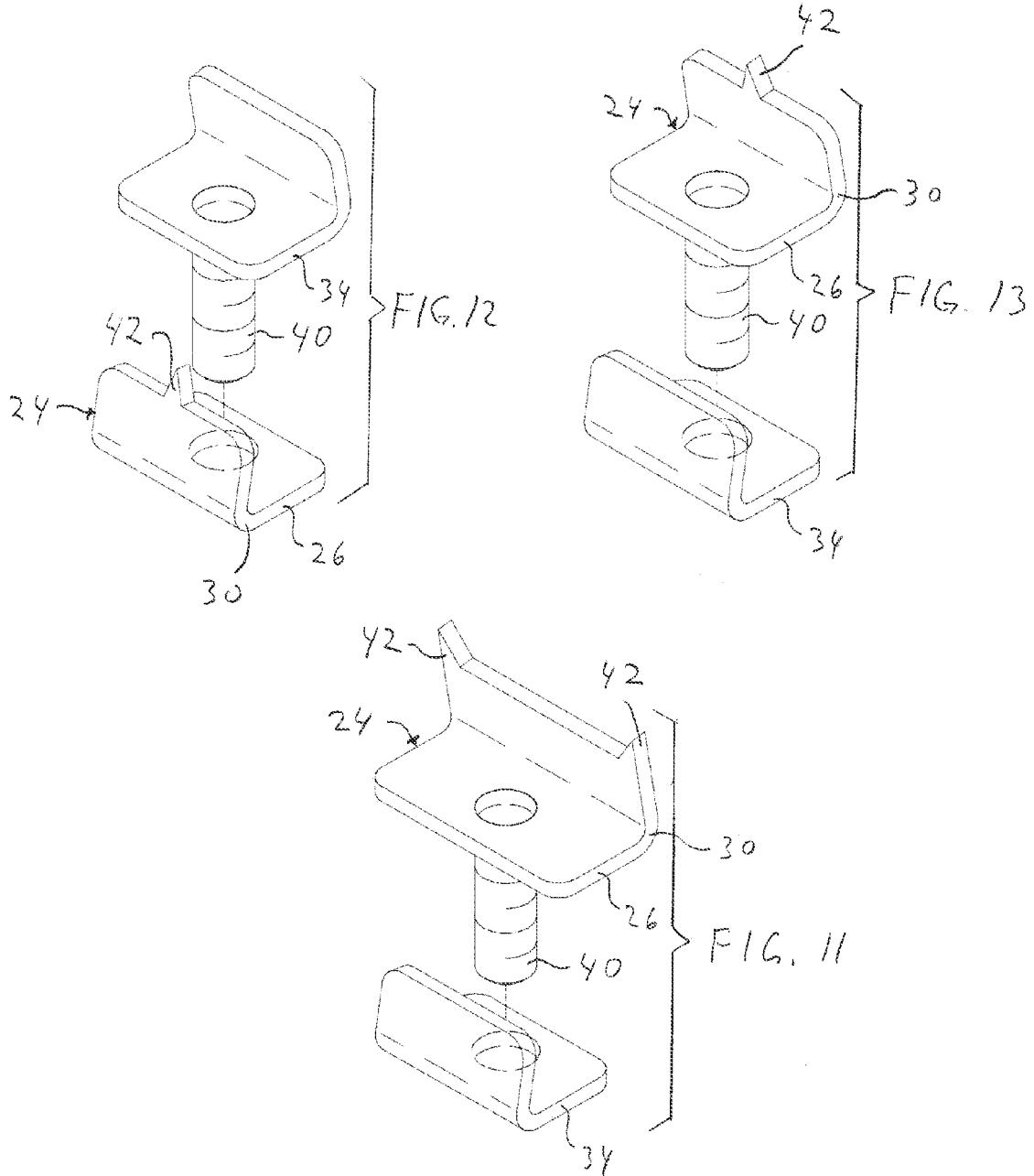

RAIL CLIP FOR CONVEYOR WEAR STRIP

FIELD OF THE INVENTION

The present invention relates to support assemblies used in assembly line and conveyor systems, and in particular, to mounting clips provided for securely engaging a wear strip in the environment of a conveyor system.

BACKGROUND OF THE INVENTION

Clamps and clips are commonly used to grip wear strips that support the surface of a conveyor conveying products along a predetermined path of an assembly line or conveyor system. The products are conveyed on a belt or track during the processing and packaging procedures of a typical manufacturer. Dependable fixation and alignment of the wear strips is important to ensure manufacturing efficiency and also to ensure that the products are not damaged from inappropriate transport.

Included in many conveyors are wear strips, which minimize wear on the moving conveyor surface. A wear strip is an item of formed/extruded plastic with a metal sheath and is used in the design of tabletop and mat-style conveyors used to transport consumer and food products and the like. The clips presently used to mount the wear strips have a disadvantage, in that they do not adequately hold the wear strips in position. While the clamping force of the present clips may hold the sheath in place, the plastic portion inside the sheath can move within the clip, which is not desirable.

This invention relates to improvements to the structures described above, and to solutions to some of the problems raised or not solved thereby.

SUMMARY OF THE INVENTION

The invention provides a conveyor system having a conveyor frame, a conveyor surface supported by and movable with respect to the frame, and a wear strip for supporting the conveyor surface. A mounting clip is connected to the frame for supporting the wear strip with respect to the frame. The mounting clip includes a grip plate having a base portion, and a pierce portion joined to the base portion at a bend, the pierce portion having a tooth protruding from the pierce portion at an edge of the pierce portion opposite the bend. The mounting clip further includes a second plate having a second plate base portion and a riser portion. A stud is connected to the second plate base portion and passes through the base portion of the grip plate and through a portion of the conveyor frame. A nut is threaded onto the stud, thereby capturing the portion of the conveyor frame. The wear strip is captured between the pierce portion and the riser portion upon installation and the tooth penetrates the wear strip upon installation.

Other objects and advantages of the invention will become apparent hereinafter.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 11 is an exploded isometric view of a clip constructed according to an alternative embodiment of the invention.

FIG. 12 is an exploded isometric view of a clip constructed according to another alternative embodiment of the invention.

FIG. 13 is an exploded isometric view of a clip constructed according to yet another alternative embodiment of the invention.

DETAILED DESCRIPTION

Figure 1:
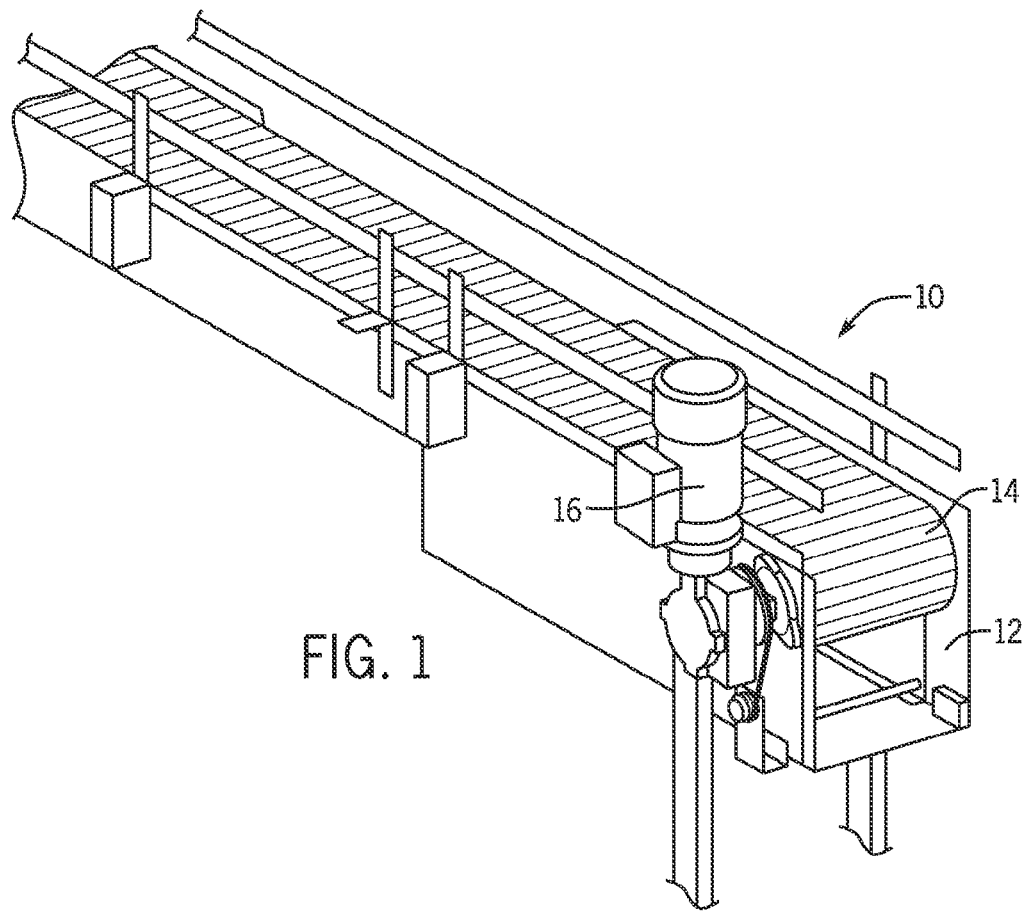
FIG. 1 is an isometric view of a conveyor constructed according to one embodiment of the invention.

Embodiments of the present invention are described herein in the context of a mounting clip for mounting a wear strip in a conveyor system. The following detailed description of the present invention is illustrative only and is not intended to be in any way limiting. Other embodiments of the present invention will readily suggest themselves, once having the benefit of this disclosure. Reference will now be made in detail to implementations of the present invention as illustrated in the accompanying drawings. Throughout the drawings and the following detailed description, the same reference numerals will be used to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-specific and business-related constraints, and that these specific goals will vary from one implementation to another and from one developer to another.

Figure 2:
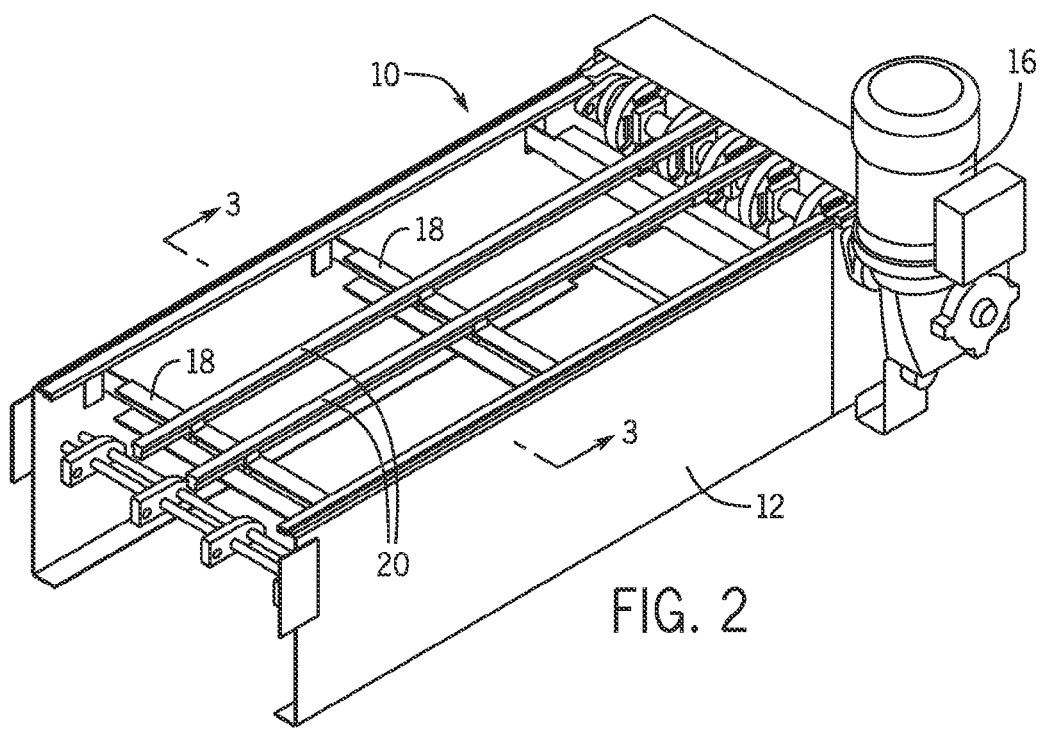
FIG. 2 is an isometric view of the conveyor shown in FIG. 1, with the conveyor belt removed, showing the wear strips mounted on a frame.
Figure 3:
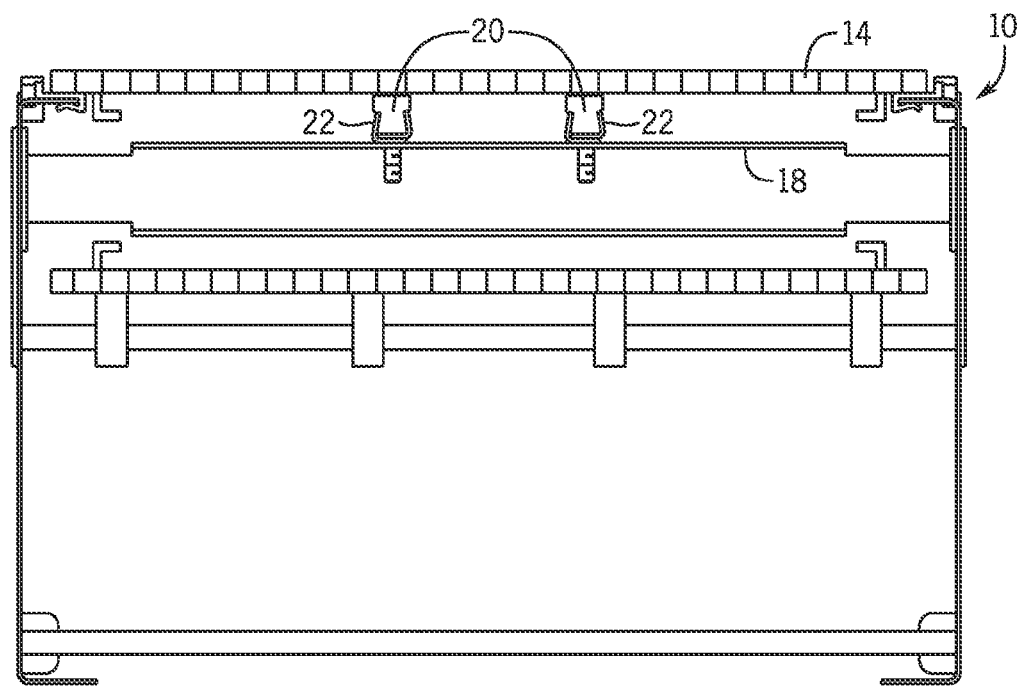
FIG. 3 is a cross sectional view of the conveyor, taken along line 3-3 of FIG. 2.

Referring now to FIG. 1, there is shown a conveyor 10, formed of a frame 12, a movable conveyor surface or conveyor belt 14 movably mounted on the frame, and a motor 16 for moving the belt. As shown in FIG. 2, the frame 12 includes cross support members 18, mounted transversely to the length of the conveyor 10 and spaced along the length of the conveyor, for supporting the conveyor belt, which is not shown in FIG. 2 so as to reveal the supporting structure underneath. Mounted on the cross support members 18 for direct support of the conveyor belt are wear strips 20. As shown in FIG. 3, the wear strips 20 are mounted to the cross support members 18 by means of mounting clips 22.

Figure 4:
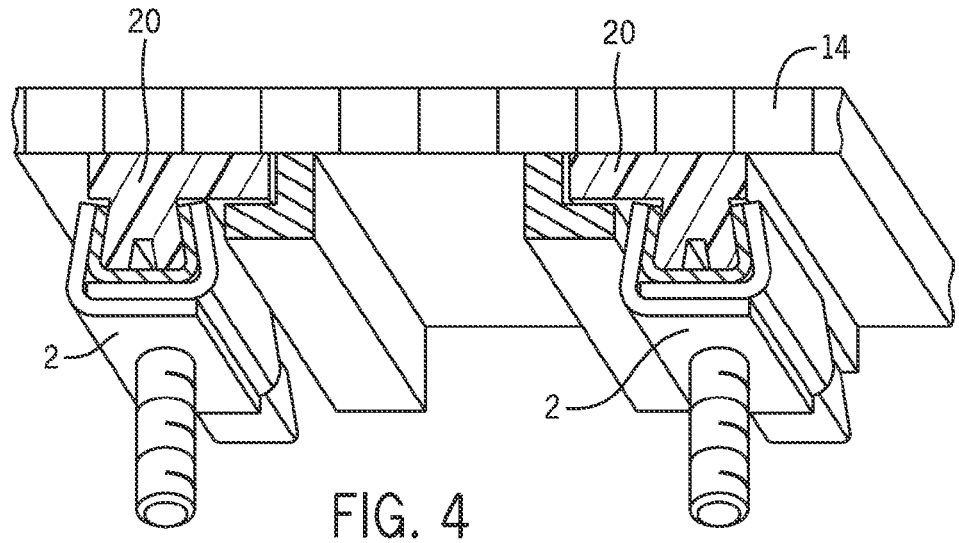
FIG. 4 is an isometric view, partially in section, of the underside of a conveyor, showing prior art clips holding the wear strips in place.
Figure 5:
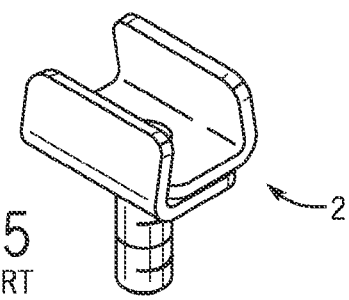
FIG. 5 is an isometric view of a prior art clip.
Figure 6:
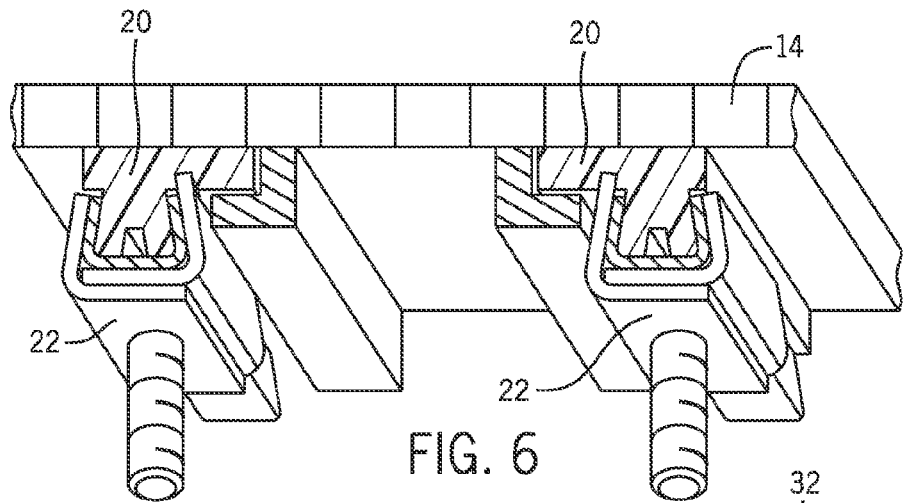
FIG. 6 is an isometric view, partially in section, of the underside of a conveyor showing clips holding the wear strip in place according to one embodiment of the present invention.

The structures shown in FIGS. 4 and 5 are provided for background purposes. In those figures is shown a prior art mounting clip 2 for supporting wear strips 20, in turn supporting the conveyor belt 14. As can be seen in those figures, the upper edge of the prior art wear clip 2 is smooth and even.

FIGS. 6-10 show the mounting clip 22 according to the present invention in more detail. As shown there, the clip 22 includes a grip plate 24. Grip plate 24 is formed of a substantially flat and planar base portion 26, joined with a substantially flat and planar pierce portion 28. Base portion 26 and pierce portion 28 are substantially integrally joined at a bend 30 to thus form the grip plate 24. The angle of bend 30, that is, the angle between the base portion 26 and the pierce portion 28, is preferably less than 90 degrees, and most preferably 81 degrees.

The clip 22 further includes a second plate 32. Second plate 32 is formed of a substantially flat and planar base portion 34, joined with a substantially flat and planar riser plate 36. Second plate base portion 34 and riser portion 36 are substantially integrally joined at a bend 38 to thus form the second plate 32. The angle of bend 38, that is, the angle between the second plate base portion 34 and the riser portion 36, is preferably similar to the angle of grip plate 24, that is, less than 90 degrees, and most preferably 81 degrees.

The clip 22 further includes a stud 40, which is threaded, for use with a nut, as will be described below. The stud 40 may be integrally formed with, connected to, or passed through an opening in, one of the grip plate 24 and the second plate 32. As clip 22 is assembled, the stud 40 is passed through an opening in the other of the grip plate 24 and the second plate 32, so that one of base portion 26 and second plate base portion 34 overlies the other.

As shown in the drawing figures, the grip plate 24 also includes at least one tooth 42 formed at the edge of the grip plate 24 opposite the bend 30, the tooth having a point projecting away from the bend. The grip plates 24 shown in FIGS. 12 and 13 have one such tooth 42. As shown in FIGS. 7, 8, 9 and 11, certain embodiments of grip plate 24 are provided with two such teeth 42, to provide a certain level of desired grip and stability.

In the embodiments shown in FIGS. 7, 8, 9, 10 and 12, the stud 40 is integrally formed with, connected to, or passed through an opening in, the second plate 32. As clip 22 is assembled, the stud 40 is passed through an opening in the grip plate 24, so that second plate base portion 34 overlies base portion 26 of the grip plate. In the embodiments shown in FIGS. 11 and 13, the grip plate 24, rather than the second plate 32, is connected to the stud 40, and the stud passes through an opening in second plate 32, so that base portion 26 of the grip plate overlies the second plate base portion 34.

Figure 7:
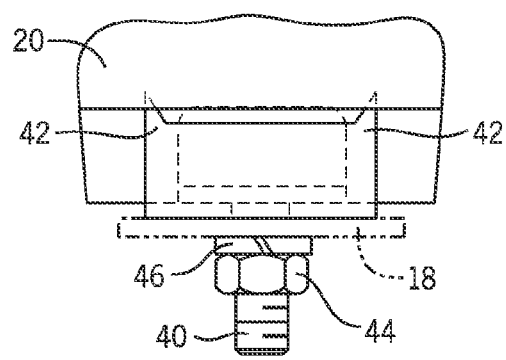
FIG. 7 is a side view of a portion of a wear strip with a clip applied thereto, according to one embodiment of the present invention.
Figure 8:
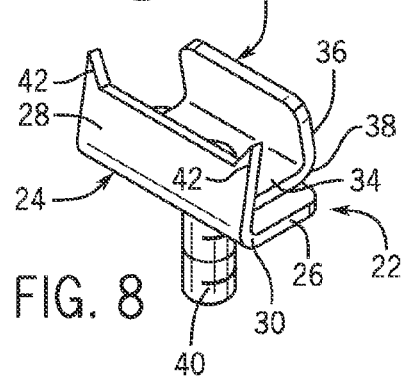
FIG. 8 is an isometric view of a clip according to one embodiment of the present invention.
Figure 9:
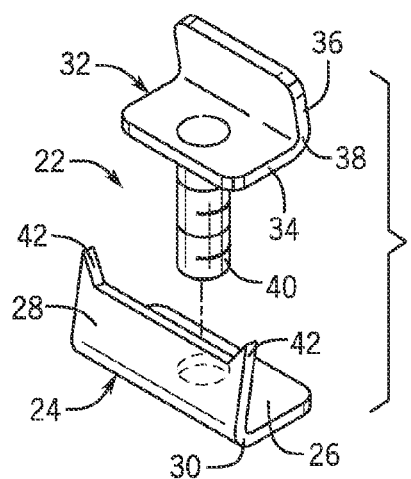
FIG. 9 is an exploded isometric view of the clip shown in FIG. 8.
Figure 10:
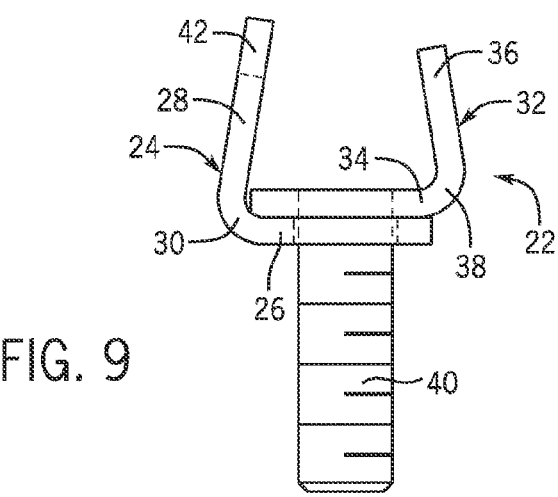
FIG. 10 is an end view of the clip shown in FIG. 8.

An example installation is shown in FIG. 7. With the clip 22 assembled as shown in FIG. 8 or FIG. 10, that is, with the stud 40 passing through or integrally formed with second plate base portion 34, and passing through grip plate base portion 36, the clip is applied to the underside of one of the wear strips 20. Then the stud 40 is passed through an opening formed for that purpose in one of the cross support members 18, as shown in FIG. 7. Once there, a nut 44, and optionally a lock washer 46 or other washer or friction-enhancing means or device, are applied to the stud 40. As the nut 44 is tightened onto the stud 40, the wear strip 20 is captured between the pierce portion 28 of the grip plate 24 and the riser portion of the second plate 23. Also as the nut 44 is tightened onto stud 40, the teeth 42 bite and penetrate into the wear strip 20. The result is a very secure mounting of the wear strip 20 to the cross support members 18 and thus the frame 12, preventing any walking of the wear strips with respect to the frame.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims. Other embodiments may also include variations with respect to the quantity, shape and location of teeth 42.

What is claimed is:

1. A mounting clip for mounting a wear strip to a conveyor frame of a conveyor, the wear strip being formed of a plastic portion, with a metal sheath partially surrounding the plastic portion, but with the plastic portion being partially exposed to an underside of a conveyor belt of the conveyor, the mounting clip comprising:
   a grip plate including a base portion and a pierce portion;
   a second plate having a second plate base portion and a riser portion; and
   a stud connected to one of the second plate and the grip plate and passing through the other of the second plate and the grip plate;
   the base portion and the pierce portion of the grip plate being joined at a bend, the pierce portion of the grip plate having a tooth projecting from the pierce portion at an edge of the pierce portion opposite the bend and projecting in a direction away from the bend, the tooth capable of penetrating the plastic portion of the wear strip extending beyond the metal sheath, upon installation.

2. The mounting clip recited in claim 1 wherein the stud is connected to the second plate base portion and passes through the base portion of the grip plate.

3. The mounting clip recited in claim 1 further comprising a nut capable of being threaded onto the stud, so as to capture a portion of the conveyor frame between the nut and the grip plate.

4. The mounting clip recited in claim 1 wherein the stud is connected to the base portion of the grip plate and passes through the second plate base portion.

5. The mounting clip recited in claim 1 further comprising a second tooth formed as part of the grip plate and capable of penetrating the wear strip upon installation.

6. A mounting system for mounting a conveyor wear strip to a conveyor frame of a conveyor, the conveyor wear strip being formed of a plastic portion, with a metal sheath partially surrounding the plastic portion, but with the plastic portion being partially exposed to an underside of a conveyor belt of the conveyor, the mounting system comprising:
   a grip plate having a base portion, and a pierce portion joined to the base portion at a bend, the pierce portion having a tooth protruding from the pierce portion at an edge of the pierce portion opposite the bend, and projecting away from the bend;
   a second plate having a second plate base portion and a riser portion;
   a stud connected to one of the second plate and the grip plate and passing through a portion of the conveyor frame; and
   a nut threaded onto the stud, thereby capturing the portion of the conveyor frame;
   the wear strip being captured between the pierce portion and the riser portion upon installation and the tooth penetrating the plastic portion of the wear strip extending beyond the metal sheath upon installation.

7. The mounting system recited in claim 6 wherein the stud is connected to the second plate base portion and passes through the base portion of the grip plate.

8. The mounting system recited in claim 6 wherein the stud is connected to the base portion of the grip plate and passes through the second plate base portion.

9. The mounting system recited in claim 6 further comprising a second tooth formed as part of the grip plate and capable of penetrating the wear strip upon installation.

10. A conveyor system comprising:
a conveyor frame;
a conveyor surface supported by and movable with respect to the frame;
a wear strip for supporting the conveyor surface, the wear strip being formed of a plastic portion, with a metal sheath partially surrounding the plastic portion, but with the plastic portion being partially exposed to an underside of the conveyor surface;
a mounting clip connected to the frame for supporting the wear strip with respect to the frame, the mounting clip including:
a grip plate having a base portion, and a pierce portion joined to the base portion at a bend, the pierce portion having two teeth, each having a point projecting from the pierce portion at an edge of the pierce portion opposite the bend, and projecting in a direction away from the bend;
a second plate having a second plate base portion and a riser portion;
a stud connected to the second plate base portion and passing through the base portion of the grip plate and through a portion of the conveyor frame; and
a nut threaded onto the stud, thereby capturing the portion of the conveyor frame;
the wear strip being captured between the pierce portion and the riser portion upon installation and the tooth penetrating the plastic portion of the wear strip extending beyond the metal sheath upon installation.

\* \* \* \* \*